United States Patent
Kim et al.

(10) Patent No.: US 10,141,826 B2
(45) Date of Patent: Nov. 27, 2018

(54) LINEAR VIBRATION MOTOR IN WHICH A PRINTED CIRCUIT BOARD HAVING A COIL COUPLED THERETO IS POSITIONED TO COVER THE COIL, SUCH THAT THE COIL DOES NOT DIRECTLY CONTACT A STATOR PART, THEREBY PREVENTING A PHENOMENON THAT THE COIL IS UNWOUND OR DISCONNECTED AND IN WHICH THERE ARE TWO RING-SHAPED DAMPING MEMBERS ALIGNED WITH, SPACED APART FROM AND AT LEAST PARTIALLY OVERLAPPING THE COIL

(71) Applicant: SAMSUNG ELECTRO-MECHANICS CO., LTD., Gyeonggi-Do (KR)

(72) Inventors: Jin Hoon Kim, Gyeonggi-do (KR); Seok June Park, Gyeonggi-do (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 230 days.

(21) Appl. No.: 14/608,388

(22) Filed: Jan. 29, 2015

(65) Prior Publication Data

US 2015/0214822 A1     Jul. 30, 2015

(30) Foreign Application Priority Data

Jan. 29, 2014     (KR) .......................... 10-2014-0011521

(51) Int. Cl.
 *H02K 33/18*     (2006.01)

(52) U.S. Cl.
 CPC ................................... *H02K 33/18* (2013.01)

(58) Field of Classification Search
 CPC ...... B06B 1/045; H02K 1/34; H02K 2203/03; H02K 33/18; H02K 41/0354; H02K 33/02; H02K 35/04
 USPC ...................................................... 310/25, 38
 See application file for complete search history.

(56) References Cited

U.S. PATENT DOCUMENTS

| | | | | |
|---|---|---|---|---|
| 9,473,008 | B2 * | 10/2016 | Hong | H02K 33/18 |
| 2001/0017491 | A1 * | 8/2001 | Ruberl | B06B 1/045 |
| | | | | 310/36 |
| 2011/0133577 | A1 * | 6/2011 | Lee | H02K 33/18 |
| | | | | 310/15 |
| 2012/0016914 | A1 | 1/2012 | Lee et al. | |
| 2012/0119595 | A1 * | 5/2012 | Choi | H02K 33/00 |
| | | | | 310/25 |
| 2013/0049491 | A1 * | 2/2013 | Kim | H02K 33/16 |
| | | | | 310/25 |
| 2014/0001889 | A1 * | 1/2014 | Hong | H02K 33/18 |
| | | | | 310/25 |

\* cited by examiner

*Primary Examiner* — Michael Andrews
(74) *Attorney, Agent, or Firm* — LRK Patent Law Firm

(57) ABSTRACT

Embodiments of the invention provide a linear vibration motor including a stator part including a magnet, a vibrator part including a coil positioned to face the magnet and a printed circuit board coupled to the coil and accommodated in an internal space of the stator part, and an elastic member connecting the stator part and the vibrator part to each other. According to at least one embodiment, the printed circuit board has one end coupled to the stator part and the other end coupled to the vibrator part and at least partially covers the coil facing the stator part.

11 Claims, 4 Drawing Sheets

LINEAR VIBRATION MOTOR IN WHICH A PRINTED CIRCUIT BOARD HAVING A COIL COUPLED THERETO IS POSITIONED TO COVER THE COIL, SUCH THAT THE COIL DOES NOT DIRECTLY CONTACT A STATOR PART, THEREBY PREVENTING A PHENOMENON THAT THE COIL IS UNWOUND OR DISCONNECTED AND IN WHICH THERE ARE TWO RING-SHAPED DAMPING MEMBERS ALIGNED WITH, SPACED APART FROM AND AT LEAST PARTIALLY OVERLAPPING THE COIL

CROSS REFERENCE TO RELATED APPLICATION

This application claims the benefit of and priority under 35 U.S.C. § 119 to Korean Patent Application No. KR 10-2014-0011521, entitled "LINEAR MOTOR," filed on Jan. 29, 2014, which is hereby incorporated by reference in its entirety into this application.

BACKGROUND

Field of the Invention

The present invention relates to a linear vibration motor.

Description of the Related Art

A general vibration motor, which is a component converting electrical energy into mechanical vibration using a principle of generating electromagnetic force, is mounted in, for example, a mobile communication terminal or a portable terminal, as non-limiting examples, to be used for silently notifying a user of call reception.

In addition, in a situation in which small-sized and high quality components are required in a mobile communication terminal in accordance with the trend in which a multifunctional mobile communication terminal has been prominent due to the rapid expansion in wireless communication and mobile phone markets, performance and a technology of a vibration motor has also been developed daily in order to overcome a disadvantage of an existing product and significantly improve quality.

Further, as the release of a cellular phone having a large-sized liquid crystal display (LCD) screen has rapidly increased in recent years, a touch screen type has been used. As a result, the vibration motor has been used to generate vibration at the time of touch, such that a demand for the vibration motor has increased.

Meanwhile, performance particularly required in the vibration depending on the touch of the touch screen is as follows. First, as the number of vibration generations depending on the touch becomes larger than that of vibration generations at the time of call reception, an operating lifespan needs to increase. Second, in order to allow users to feel the vibrations at the time of touch, a response speed of the vibration needs to increase in accordance with a touch speed of the screen.

A linear vibration motor, which is a vibration motor capable of satisfying the above-mentioned characteristics, has a resonant frequency determined by a spring and a vibrator part connected to the spring and is oscillated by electromagnetic force to thereby generate vibration. In addition, electromagnetic force is generated by the interaction between a magnet of the vibrator part and current applied to a coil of a stator part and having a predetermined frequency.

However, a linear vibration motor, according to the conventional art, including, for example, U.S. Patent Publication 2012/0016914, has a problem that a coil coupled to a printed circuit board is disconnected and unwound due to external force.

SUMMARY

Accordingly, embodiments of the invention have been made to provide a linear vibration motor in which a printed circuit board having a coil coupled thereto is positioned to cover the coil, such that the coil does not directly contact a stator part, thereby preventing a phenomenon that the coil is unwound or disconnected.

According to at least one embodiment of the invention, there is provided a linear vibration motor including a stator part including a magnet, a vibrator part including a coil positioned to face the magnet and a printed circuit board coupled to the coil and accommodated in an internal space of the stator part, and an elastic member connecting the stator part and the vibrator part to each other, wherein the printed circuit board has one end coupled to the stator part and the other end coupled to the vibrator part and at least partially covers the coil facing the stator part.

According to at least one embodiment of the invention, the printed circuit board includes a coupling plate fixed to the stator part, an elastic part extended from the coupling plate in a spiral direction to have elastic force, a contact part connected to the elastic part and having an end portion of the coil coupled thereto, and a disk part connected to the contact part and having the coil coupled thereto.

According to at least one embodiment of the invention, the coil is coupled to the disk part to be covered with the disk part.

According to at least one embodiment of the invention, the stator part corresponding to the disk part is mounted with a damping member.

According to at least one embodiment of the invention, the printed circuit board further includes a coating layer formed on the contact part to which the coil is coupled.

According to at least one embodiment of the invention, the stator part further includes a case having the internal space formed therein to accommodate the vibrator part and having opened one side, a bracket closing the internal space of the case, and damping members facing the vibrator part and each installed on one surfaces of the case and the bracket.

According to at least one embodiment of the invention, at least one of the case and the bracket is mounted with the magnet.

According to at least one embodiment of the invention, any one or both of the case and the bracket on which the magnet is mounted is provided with seating parts.

According to at least one embodiment of the invention, the vibrator part further includes a weight body moving together with the coil.

According to at least one embodiment of the invention, the stator part further includes a plate yoke coupled to one surface of the magnet.

According to at least one embodiment of the invention, the coil is formed in a hollow shape so that the magnet passes therethrough.

According to at least one embodiment of the invention, the magnet includes a first magnet coupled to one surface of the bracket and a second magnet facing the first magnet and coupled to one surface of the case.

According to at least one embodiment of the invention, the first and second magnets face each other and are magnetized as the same pole.

According to at least one embodiment of the invention, the stator part further includes a plate yoke coupled to one surface of the first magnet or one surface of the second magnet.

According to at least one embodiment of the invention, the vibrator part has the elastic member coupled to one side thereof and has the printed circuit board coupled to the other side thereof.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
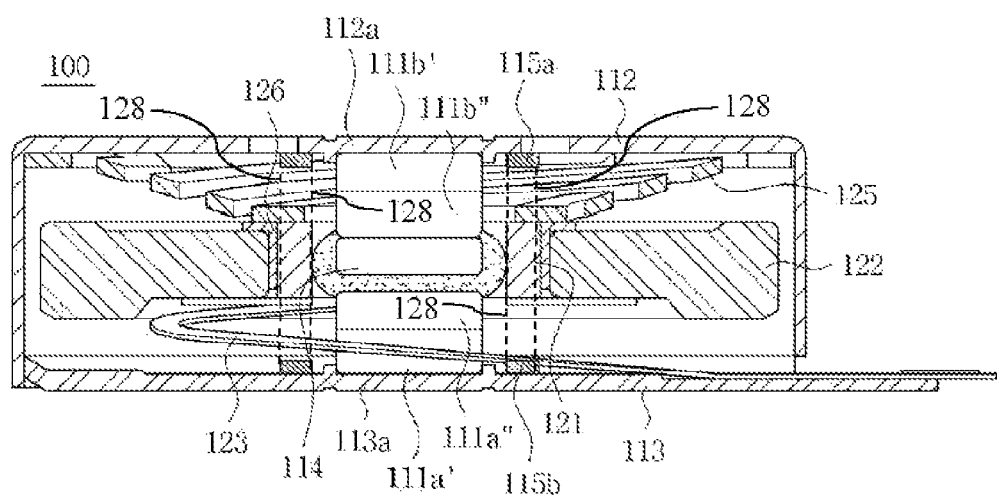
FIG. 1 is a schematic cross-sectional view of a linear vibration motor according to an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

Figure 2:
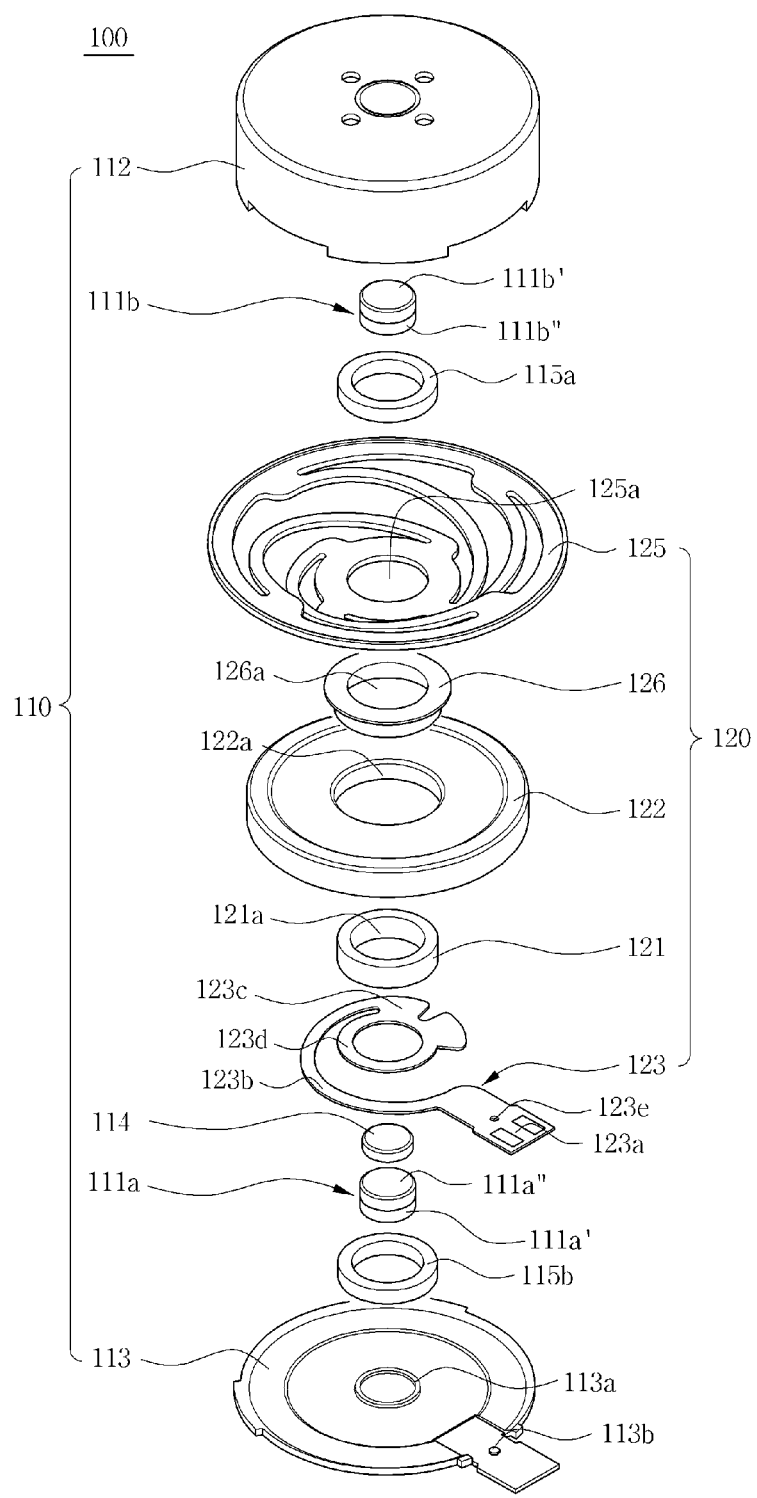
FIG. 2 is a schematic exploded perspective view of the linear vibration motor shown in FIG. 1 according to an embodiment of the invention.

FIG. 1 is a schematic cross-sectional view of a linear vibration motor according to an embodiment of the invention; and FIG. 2 is a schematic exploded perspective view of the linear vibration motor shown in FIG. 1 according to an embodiment of the invention.

As shown in FIGS. 1 and 2, the linear vibration motor 100 is configured to include a stator part 110, a vibrator part 120, and an elastic member 125 connecting the stator part and the vibrator part to each other, wherein the stator part 110 includes magnets 111a and 111b, a case 112, a bracket 113, a plate yoke 114, and damping members 115a and 115b, and the vibrator part 120 includes a coil 121, a weight body 122, a printed circuit board 123, and a circular yoke 126. In addition, at least a portion of the printed circuit board 123 is positioned to cover the coil 121 facing the stator part 110. As shown in FIGS. 1 and 2, damping members 115a and 115b are each ring-shaped, aligned with coil 121, spaced apart from coil 121 and at least partially overlap coil 121. Dashed lines 128 also show how damping members 115a and 115b overlap coil 121.

According to at least one embodiment, the vibrator part 120 has the elastic member 125 coupled to one side thereof and has the printed circuit board 123 coupled to the other side thereof.

According to at least one embodiment, in the stator part 110, the case 112 has an internal space formed therein to cover the vibrator part and is coupled to the bracket 113.

According to at least one embodiment, the bracket 113 has the printed circuit board 123 fixed and coupled thereto.

According to at least one embodiment, the magnet is mounted on at least one of the case and the bracket.

As an example, according to at least one embodiment, the magnets 111a and 111b include a first magnet 111a coupled to an upper surface of an inner portion of the bracket 113 facing the weight body and a second magnet 111b coupled to an upper surface of an inner portion of the case facing the first magnet. Further, the first and second magnets 111a and 111b are configured so that surfaces thereof facing each other have the same polarity in order to increase magnetic efficiency. Thus, the first magnet 111a includes an S pole 111a' and an N pole 111a", which are two poles having different polarities, and the second magnets 111b includes an S pole 111b' and an N pole 111b", which are two poles having different polarities, wherein the N pole 111a" and the N pole 111b" are positioned to face each other.

According to at least one embodiment, the case 112 and the bracket 113 each have seat parts 112a and 113a formed in order to couple the magnets 111a and 111b to central portions thereof.

According to at least one embodiment, the plate yoke 114 is selectively coupled to an upper portion of the first magnet 111a or a lower portion of the second magnet 111b.

According to at least one embodiment, the damping members 115a and 115b face the vibrator part 120 and are formed on one surface of the bracket 113 and the case 112, respectively. In addition, the damping member 115b coupled to the bracket 113 has a shape corresponding to that of a disk part 123d of a printed circuit board 123 to be described below According to at least one embodiment, the coil 121 faces the stator part and is coupled to the disk part 123d to be covered with the disk part 123d.

Next, in the vibrator part 120, the coil 121 is positioned to face the magnets 111a and 111b.

According to at least one embodiment, the weight body 122 is coupled to the coil 121 to thereby vibrate together with the coil 121.

According to at least one embodiment, the printed circuit board 123 has one end coupled to the coil 121 and the other end coupled to the bracket 113.

According to at least one embodiment, the printed circuit board 123 includes a coupling plate 123a fixed and coupled to the bracket 113, an elastic part 123b extended from the coupling plate 123a in a spiral direction to have elastic force, a contact part 123c connected to the elastic part 123b and having an end portion 121b of the coil 121 coupled thereto, and the disk part 123d connected to the contact part 123c and having the coil 121 coupled thereto.

In addition, the coupling plate 123a of the printed circuit board 123 is provided with a fixing groove 123e for fixing the printed circuit board 123 to the bracket 113, and the bracket 113 is provided with a fixing protrusion 113b corresponding to the fixing groove 123e.

Through the above-mentioned configuration, the printed circuit board 123 is extended in the spiral direction while enclosing an outer portion of the first magnet 111a to accommodate the first magnet 111a therein and is coupled to the coil 121, thereby elastically supporting the vibrator part 120 at a lower portion of the vibrator part 120. To this end, the printed circuit board 123 is formed in a spring shape or a coil spring shape in which it is extended in the spiral direction.

According to at least one embodiment, the circular yoke 126 is coupled between the coil 121 and the weight body 122 in order to increase a magnetic flux of the magnet. Further, the circular yoke 126 is coupled to an upper portion of the weight body 122 and be fitted into a hollow part 122a of the weight body.

Next, the elastic member 125 connects the vibrator part and the stator part to each other as described above and elastically supports the vibrator part with respect to the stator part.

According to at least one embodiment, the elastic member 125 has one end coupled to the case 112 and the other end coupled to the vibrator part 120.

According to at least one embodiment, the elastic member 125 is electrically connected to the coil 121 and be selectively coupled to the coil 121, the yoke 126, and the weight body 122 in being coupled to the vibrator part 120.

According to at least one embodiment, the weight body 122 includes the hollow part 122a formed therein, wherein the hollow part 122a accommodates the circular yoke 126 and the coil 121 therein and allows linear movement of the magnets 111a and 111b and the plate yoke 114 to be performed in a state in which the magnets 111a and 111b and the plate yoke 114 are positioned therein.

In addition, each of the elastic member 125, the circular yoke 126, and the coil 121 includes hollow parts 125a, 126a, and 121a formed therein so that the linear movement of the magnets 111a and 111b and the plate yoke 114 is performed in a state in which the magnets 111a and 111b and the plate yoke 114 are positioned therein.

Further, the printed circuit board 123 according to at least one embodiment of the invention is a flexible printed circuit (FPC) having elasticity.

Figure 3:
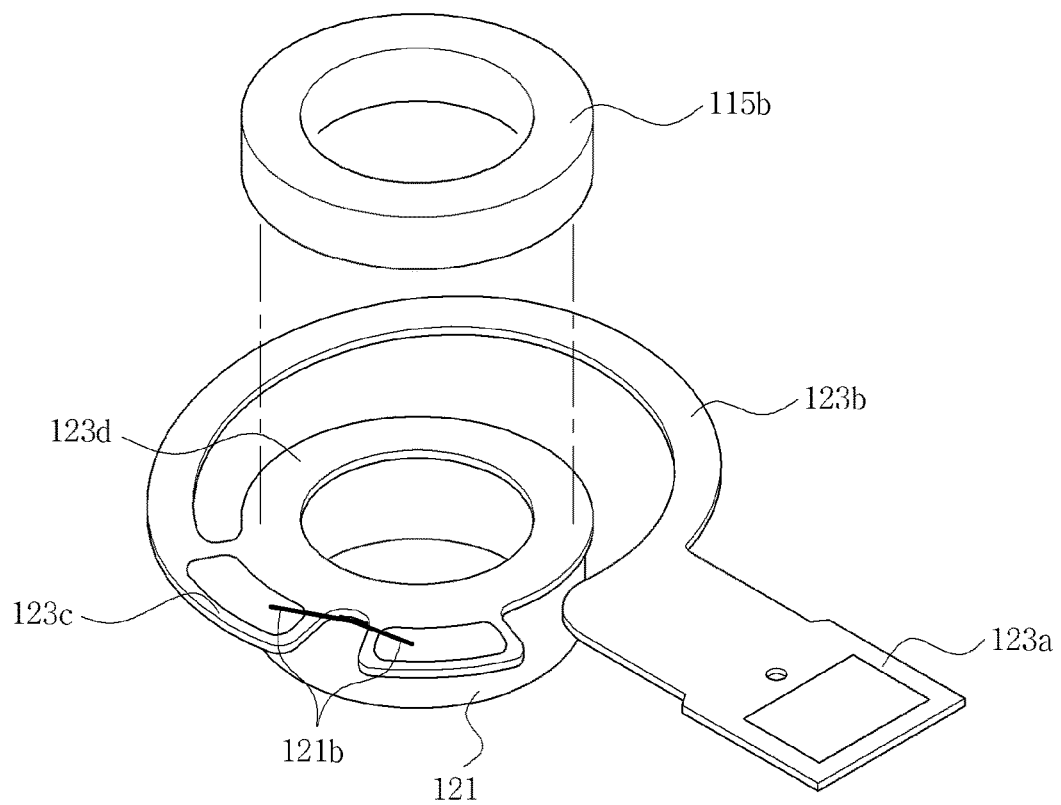
FIG. 3 is a perspective view showing a coupling part between a printed circuit board and a coil according to an embodiment of the invention in the linear vibration motor shown in FIG. 2.

Further, as shown in FIG. 3, the end portion 121b of the coil 121 is physically and electrically connected to the contact part 123c of the printed circuit board. Further, as described above, the damping member 115b is positioned to face the disk part 123d of the printed circuit board 123.

Through the above-mentioned configuration, the coil 121 does not directly contact the damping member 115b and the contact part 123c of the printed circuit board 123 is not positioned to face the damping member 115b, such that a phenomenon that the coil is unwound and disconnected is prevented due to continuous impact of the damping member.

Through the above-mentioned configuration, in the linear vibration motor according to at least one embodiment of the invention, when external power is supplied to the coil 121 through the printed circuit board 123, the vibrator part linearly vibrates by electromagnetic force between the coil 121 and the first and second magnets 111a and 111b. Here, in the case in which displacement of the vibrator part 120 becomes large, metal high frequency due to friction between the vibrator part and the stator part is alleviated and the phenomenon that the coil is unwound and disconnected is prevented, by the damping members 115a and 115b, such that reliability is secured.

Figure 4:
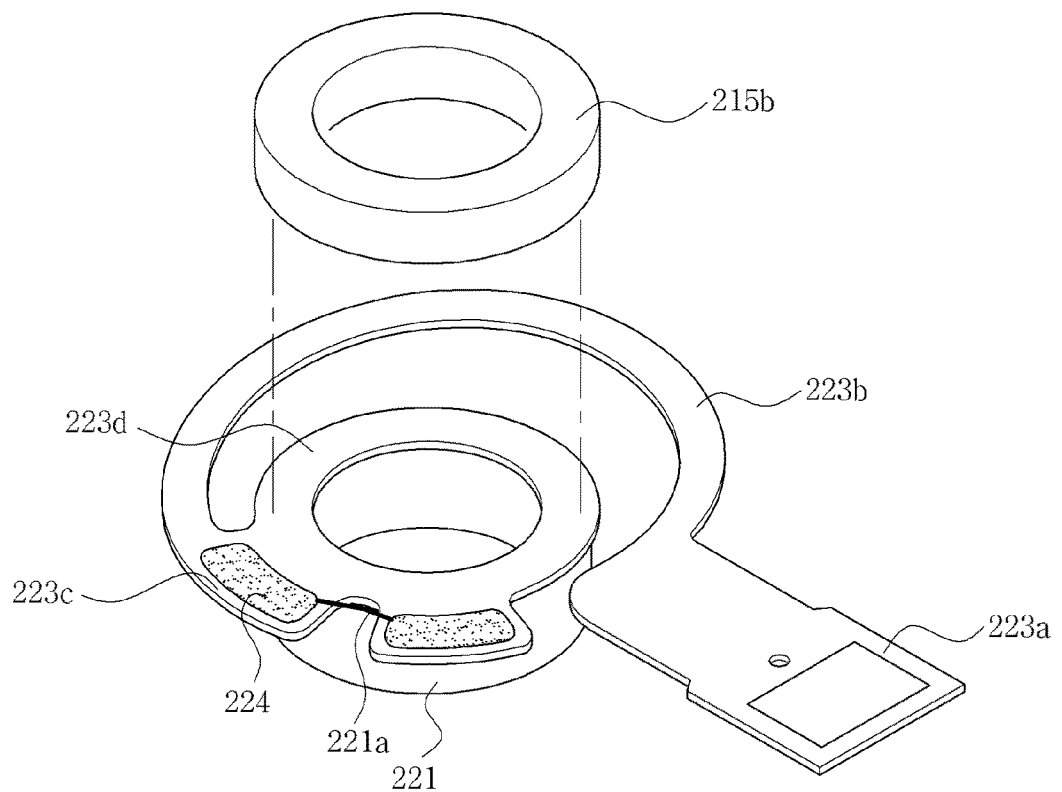
FIG. 4 is a perspective view showing a coupling part between a printed circuit board and a coil according to another embodiment of the invention in the linear vibration motor shown in FIG. 2.

FIG. 4 is a perspective view showing a coupling part between a printed circuit board and a coil according to another embodiment of the invention in the linear vibration motor shown in FIG. 2.

As shown in FIG. 4, the end portion 221b of the coil 221 is physically and electrically connected to the contact part 223c of the printed circuit board. In addition, the damping member 215b is positioned to face the disk part 223d of the printed circuit board 223.

Further, the contact part 223c of the printed circuit board 223 to which the end portion 221b of the coil is coupled is further provided with a coating layer 224 attached to or formed on the contact part 223c while covering the end portion 221b of the coil. The coating layer 224 is to improve physical and electrical coupling force between the end portion 221b of the coil and the contact part 223c of the printed circuit board.

Through the above-mentioned configuration, the coil 221 does not directly contact the damping member 215b, the contact part 223c of the printed circuit board 223 is not positioned to face the damping member 215b, and the coating layer 224 is attached to or formed on the contact part 223c, such that physical and electrical coupling force between the coil and the contact part of the printed circuit board is improved and a phenomenon that the coil is unwound and disconnected is prevented due to continuous impact of the damping member.

As set forth above, according to various embodiments of the invention, the linear vibration motor in which the printed circuit board having the coil coupled thereto is positioned to cover the coil, such that the stator part and the coil do not directly contact each other, thereby preventing a phenomenon that the coil is unwound or disconnected is obtained.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A linear vibration motor, comprising:
a stator part comprising a magnet;
a vibrator part comprising a coil positioned to face the magnet and a printed circuit board coupled to the coil and accommodated in an internal space of the stator part; and
an elastic member connecting the stator part and the vibrator part to each other,
wherein the printed circuit board has one end coupled to the stator part and the other end coupled to the vibrator part and at least partially covers the coil facing the stator part,
wherein the printed circuit board comprises:
a coupling plate fixed to the stator part;
an elastic part extended from the coupling plate in a spiral direction to have elastic force;
a contact part connected to the elastic part and having an end portion of the coil coupled thereto; and
a disk part connected to the contact part and having the coil coupled thereto,
wherein the coil is coupled to the disk part to be covered with the disk part; and
wherein the stator part corresponding to the disk part is mounted with a first damping member,
wherein the stator part comprises:
a case having the internal space formed therein to accommodate the vibrator part and having an opened one side;
a bracket closing the internal space of the case; and
a second damping member facing the vibrator part and installed on a surface of the case,
wherein the first damping member faces the vibrator part and is installed on a surface of the bracket;
wherein the first damping member and the second damping member are each ring-shaped, are each aligned with the coil, are each spaced apart from the coil and each at least partially overlap the coil in the movement direction, and
wherein the contact part of the printed circuit board is positioned in the outer area of the disk part not to overlap the first damping member.

2. The linear vibration motor of claim 1, wherein at least one of the case and the bracket is mounted with the magnet.

3. The linear vibration motor of claim 2, wherein any one or both of the case and the bracket on which the magnet is mounted are provided with seating parts.

4. The linear vibration motor of claim 1, wherein the vibrator part further comprises a weight body moving together with the coil.

5. The linear vibration motor of claim 1, wherein the stator part further comprises a plate yoke coupled to one surface of the magnet.

6. The linear vibration motor of claim 1, wherein the coil is formed in a hollow shape so that the magnet passes therethrough.

7. The linear vibration motor of claim 1, wherein the stator part further comprises:
a case having the internal space formed therein to accommodate the vibrator part and having an opened one side,
wherein the magnet comprises a first magnet coupled to the surface of the bracket and a second magnet facing the first magnet and coupled to the surface of the case.

8. The linear vibration motor of claim 7, wherein the first and second magnets face each other and are magnetized as the same pole.

9. The linear vibration motor of claim 7, wherein the stator part further comprises a plate yoke coupled to one surface of the first magnet or one surface of the second magnet.

10. The linear vibration motor of claim 1, wherein the vibrator part has the elastic member coupled to one side thereof and has the printed circuit board coupled to the other side thereof.

11. The linear vibration motor of claim 1, wherein the contact part is located so that the contact part is not overlapped by the first damping member or the second damping member in the movement direction.

* * * * *